US011852867B2

(12) United States Patent
Bian et al.

(10) Patent No.: US 11,852,867 B2
(45) Date of Patent: Dec. 26, 2023

(54) PHOTONIC DEVICES INTEGRATED WITH REFLECTORS

(71) Applicant: GLOBALFOUNDRIES U.S. Inc., Santa Clara, CA (US)

(72) Inventors: Yusheng Bian, Ballston Lake, NY (US); Bo Peng, Malta, NY (US); Michal Rakowski, Malta, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 57 days.

(21) Appl. No.: 17/454,063

(22) Filed: Nov. 9, 2021

(65) Prior Publication Data

US 2022/0057576 A1 Feb. 24, 2022

Related U.S. Application Data (62) Division of application No. 16/817,582, filed on Mar. 12, 2020, now Pat. No. 11,243,350.

(51) Int. Cl.
*G02B 6/122* (2006.01)
*G02B 6/12* (2006.01)

(52) U.S. Cl.
CPC .... *G02B 6/1225* (2013.01); *G02B 2006/1213* (2013.01); *G02B 2006/12104* (2013.01)

(58) Field of Classification Search
CPC ................ G02B 6/12; G02B 6/1225; G02B 2006/12104; G02B 2006/1213
See application file for complete search history.

(56) References Cited

U.S. PATENT DOCUMENTS

| 5,420,947 | A  | 5/1995 | Li et al. |
| 5,500,734 | A  | 3/1996 | Spanner et al. |
| 7,388,894 | B2 | 6/2008 | O'Daniel et al. |
| 7,535,944 | B1 | 5/2009 | Guilfoyle et al. |
| 8,267,583 | B2 | 9/2012 | Yao et al. |
| 8,503,841 | B2 | 8/2013 | Kopp et al. |

(Continued)

OTHER PUBLICATIONS

Wissem Sfar Zaoui et al., CMOS-Compatible Polarization Splitting Grating Couplers With a Backside Metal Mirror, IEEE Photonics Technology Letters, Jul. 15, 2013, 1395-1397, vol. 25, No. 14, IEEE, New Jersey, US.

(Continued)

*Primary Examiner* — Tina M Wong
(74) *Attorney, Agent, or Firm* — David Cain (57) ABSTRACT

The present disclosure generally relates to semiconductor devices for use in optoelectronic/photonic applications and integrated circuit (IC) chips. More particularly, the present disclosure relates to semiconductor devices having a reflector and a photonic component and a method of forming the same. The present disclosure provides a semiconductor device having a substrate, a photonic component arranged above the substrate, a bottom reflector arranged above the substrate and positioned below the photonic component, in which the bottom reflector has a plurality of grating structures configured to reflect electromagnetic waves towards the photonic component, and a top reflector arranged above the photonic component, in which the top reflector has a plurality of grating structures configured to reflect electromagnetic waves towards the photonic component.

15 Claims, 12 Drawing Sheets

(56) References Cited

U.S. PATENT DOCUMENTS

| | | |
|---|---|---|
| 9,715,064 B1 | 7/2017 | Gambino et al. |
| 10,185,092 B1 | 1/2019 | Bian et al. |
| 10,324,258 B2 | 6/2019 | Li et al. |
| 10,921,526 B2 | 2/2021 | Bian et al. |
| 2001/0012244 A1 | 8/2001 | Shimano et al. |
| 2006/0067617 A1 | 3/2006 | Gaylord et al. |
| 2007/0081758 A1 | 4/2007 | Tono et al. |
| 2008/0219615 A1 | 9/2008 | Cunningham |
| 2010/0014808 A1 | 1/2010 | Flammer |
| 2010/0222570 A1 | 9/2010 | Ratnam et al. |
| 2010/0232016 A1 | 9/2010 | Landa et al. |
| 2011/0038588 A1 | 2/2011 | Kim et al. |
| 2011/0158278 A1 | 6/2011 | Koch |
| 2011/0222570 A1 | 9/2011 | Junesand et al. |
| 2012/0008658 A1 | 1/2012 | Chung |
| 2012/0201491 A1 | 8/2012 | Zhou |
| 2013/0121639 A1 | 5/2013 | Shimizu |
| 2014/0010498 A1 | 1/2014 | Verslegers et al. |
| 2015/0010265 A1 | 1/2015 | Popovich et al. |
| 2015/0117817 A1 | 4/2015 | Chen et al. |
| 2015/0168647 A1 | 6/2015 | Liang et al. |
| 2015/0211960 A1 | 7/2015 | Shimizu |
| 2015/0286008 A1 | 10/2015 | Shimizu et al. |
| 2016/0019664 A1 | 1/2016 | Hirakawa et al. |
| 2016/0109659 A1 | 4/2016 | Jiang |
| 2016/0131848 A1 | 5/2016 | Svilans |
| 2016/0238447 A1 | 8/2016 | Cho et al. |
| 2017/0184450 A1 | 6/2017 | Doylend et al. |
| 2017/0207600 A1 | 7/2017 | Klamkin et al. |
| 2017/0336560 A1 | 11/2017 | Boeuf et al. |
| 2018/0212399 A1 | 7/2018 | Menezo et al. |
| 2019/0025518 A1 | 1/2019 | Ji et al. |
| 2019/0114484 A1 | 4/2019 | Keech et al. |
| 2019/0140133 A1* | 5/2019 | Chen ............... H01L 31/028 |
| 2019/0170938 A1 | 6/2019 | Plantier et al. |
| 2019/0207368 A1 | 7/2019 | Meister et al. |
| 2019/0265408 A1 | 8/2019 | Ji et al. |
| 2019/0310417 A1 | 10/2019 | Coolbaugh et al. |
| 2020/0105957 A1 | 4/2020 | Mathai et al. |
| 2020/0116631 A1 | 4/2020 | Sakamoto et al. |
| 2020/0174194 A1 | 6/2020 | Kojima et al. |
| 2020/0280172 A1 | 9/2020 | Zhao et al. |
| 2020/0341191 A1 | 10/2020 | Meade et al. |
| 2020/0341200 A1 | 10/2020 | Van Vaerenbergh et al. |
| 2021/0091056 A1 | 3/2021 | Yu et al. |

OTHER PUBLICATIONS

Dirk Taillaert et al., Compact efficient broadband grating coupler for silicon-on-insulator waveguides, Optics Letters, Dec. 1, 2004, 2749-2751, vol. 29, No. 23, Optical Society of America, US.

Stijn Scheerlinck et al., Efficient, broadband and compact metal grating couplers for silicon-on-insulator waveguides, Optics Express, Jul. 23, 2007, 9625-9630, vol. 15, No. 15, Optical Society of America, US.

Shankar Kumar Selvaraja et al., Highly efficient grating coupler between optical fiber and silicon photonic circuit, 2009,1-2, IEEE, New Jersey, US.

Wissem Sfar Zaoui et al., Cost-effective CMOS-compatible grating couplers with backside metal mirror and 69% coupling efficiency, Optics Express, Dec. 10, 2012, 238-243, vol. 20, No. 26, Optical Society of America, US.

F. Van Laere et al., Compact grating couplers between optical fibers and Silicon-on-Insulator photonic wire waveguides with 69% coupling efficiency, 2006, 1-3, Optical Society of America, US.

Ken Giewont et al., 300-mm Monolithic Silicon Photonics Foundry Technology, IEEE Journal of Selected Topics in Quantum Electronics, Sep./Oct. 2019, 1-12, vol. 25, No. 5, IEEE, New Jersey, US.

Michal Rakowski et al., 45nm CMOS-Silicon Photonics Monolithic Technology (45CLO) for next-generation, low power and high speed optical interconnects, 2020, 1-3, OSA, US.

Matthew K. Emsley et al., Silicon Substrates With Buried Distributed Bragg Reflectors for Resonant Cavity-Enhanced Optoelectronics, IEEE Journal of Selected Topics in Quantum Electronics, Jul./Aug. 2002, 948-955, vol. 8, No. 4, IEEE, New Jersey, US.

Tsung-Ting Wu et al., A critically coupled Germanium photodetector under vertical illumination, Optics Express, Dec. 31, 2012, 29338-29346, vol. 20, No. 28, Optical Society of America, US.

Du Bosq et al., High-reflectivity intracavity Bragg mirrors for the far-infrared p-Ge laser, Proc. of SPIE, 167-173, vol. 5411, SPIE, Florida, United States.

* cited by examiner

PHOTONIC DEVICES INTEGRATED WITH REFLECTORS

FIELD OF THE INVENTION

The present disclosure generally relates to semiconductor devices for use in optoelectronic/photonic applications and integrated circuit (IC) chips. More particularly, the present disclosure relates to semiconductor devices having a reflector and a photonic component and a method of forming the same.

BACKGROUND

Optoelectronic or photonic devices are a type of semiconductor device that detects and harnesses electromagnetic energy such as light. The use of such devices in high-speed switching and transceiver devices in data communications are but a few examples that highlight the advantages of processing both optical and electrical signals within a single integrated circuit (IC) device.

An integrated photonic device may include a photonic component fabricated on a substrate, along with other IC components such as transistors. A greater efficiency of light absorption with minimal loss of light energy during transmission is required for the implementation of these devices in optoelectronic applications. Ideally, it is desirable to have the absorption efficiency as close as possible to 100 percent and the energy loss as close as possible to zero percent. However, in practice, a significant amount of light escapes from the photonic component and the efficiency of absorption is greatly reduced, thereby negatively affecting the responsivity/sensitivity of the photonic device.

Therefore, there is a need to provide semiconductor devices that can overcome, or at least ameliorate, one or more of the disadvantages as described above.

SUMMARY

In an aspect of the present disclosure, there is provided a semiconductor device having a substrate, a photonic component arranged above the substrate, and a bottom reflector arranged above the substrate and positioned below the photonic component, in which the bottom reflector has a plurality of grating structures configured to reflect electromagnetic waves towards the photonic component.

In another aspect of the present disclosure, there is provided a semiconductor device having a substrate, a photonic component arranged above the substrate, and a top reflector arranged above the photonic component, in which the top reflector has a plurality of grating structures configured to reflect electromagnetic waves towards the photonic component.

In yet another aspect of the present disclosure, there is provided a semiconductor device having a substrate, a photonic component arranged above the substrate, a bottom reflector arranged above the substrate and positioned below the photonic component, in which the bottom reflector has a plurality of grating structures configured to reflect electromagnetic waves towards the photonic component, and a top reflector arranged above the photonic component, in which the top reflector has a plurality of grating structures configured to reflect electromagnetic waves towards the photonic component.

Advantageously, the present disclosure is found to provide increased coupling efficiency, increased absorption and increased responsivity of the photonic component in the semiconductor device. For example, the provision of a reflector having a plurality of grating structures may increase the coupling efficiency of waveguides as well as enhance the absorption and responsivity of photodetectors. The plurality of grating structures may also form a metamaterial provided on a two-dimensional surface with properties that differ from bulk properties.

BRIEF DESCRIPTION OF THE DRAWINGS

The present disclosure may be understood by reference to the following description taken in conjunction with the accompanying drawings.

For simplicity and clarity of illustration, the drawings illustrate the general manner of construction, and certain descriptions and details of well-known features and techniques may be omitted to avoid unnecessarily obscuring the discussion of the described embodiments of the present disclosure. Additionally, elements in the drawings are not necessarily drawn to scale. For example, the dimensions of some of the elements in the drawings may be exaggerated relative to other elements to help improve understanding of embodiments of the present disclosure. The same reference numerals in different drawings denote the same elements, while similar reference numerals may, but do not necessarily, denote similar elements.

DETAILED DESCRIPTION

Various illustrative embodiments of the present disclosure are described below. The embodiments disclosed herein are exemplary and not intended to be exhaustive or limiting to the present disclosure.

As used herein, "patterning techniques" includes deposition of material or photoresist, patterning, exposure, development, etching, cleaning, and/or removal of the material or photoresist as required in forming a described pattern, structure or opening. Examples of techniques for patterning include, but not limited to, wet etch lithographic processes, dry etch lithographic processes or direct patterning processes. Such techniques may use mask sets and mask layers.

Additionally, "deposition techniques" refer to the process of applying a material over another material (or the substrate). Exemplary techniques for deposition include, but not limited to, spin-on coating, sputtering, chemical vapor deposition (CVD), physical vapor deposition (PVD), molecular beam deposition (MBD), pulsed laser deposition (PLD), liquid source misted chemical deposition (LSMCD), atomic layer deposition (ALD).

Figure 1:
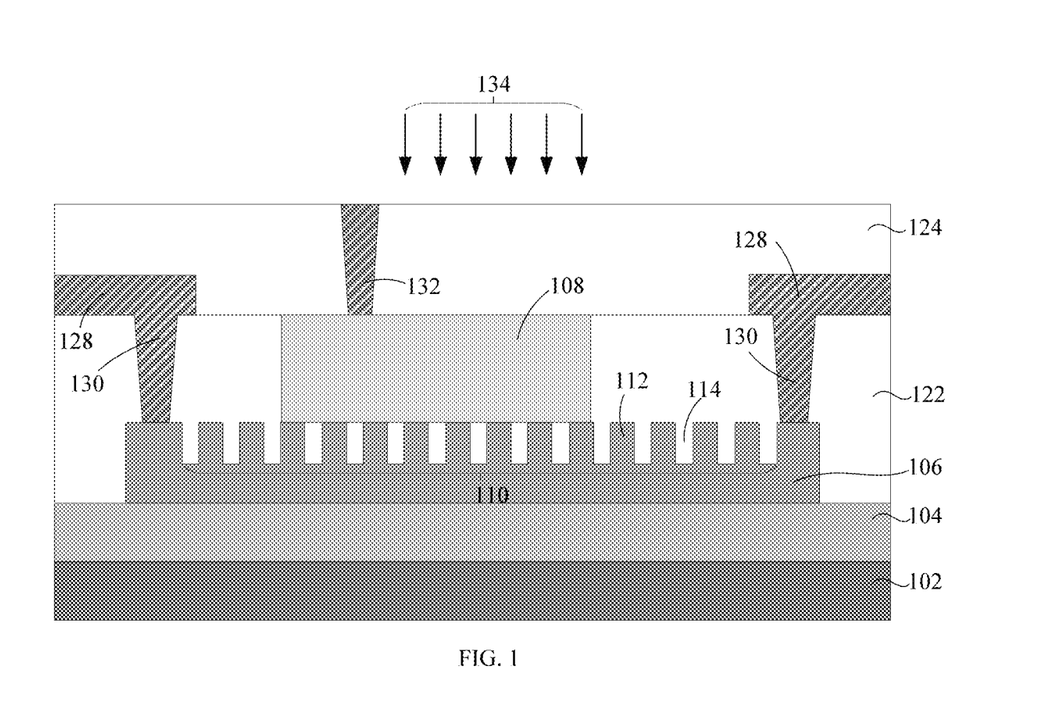
FIG. 1 and FIG. 2 are cross-sectional views depicting embodiments of a semiconductor device having at least one bottom reflector, in accordance with the present disclosure.
Figure 2:
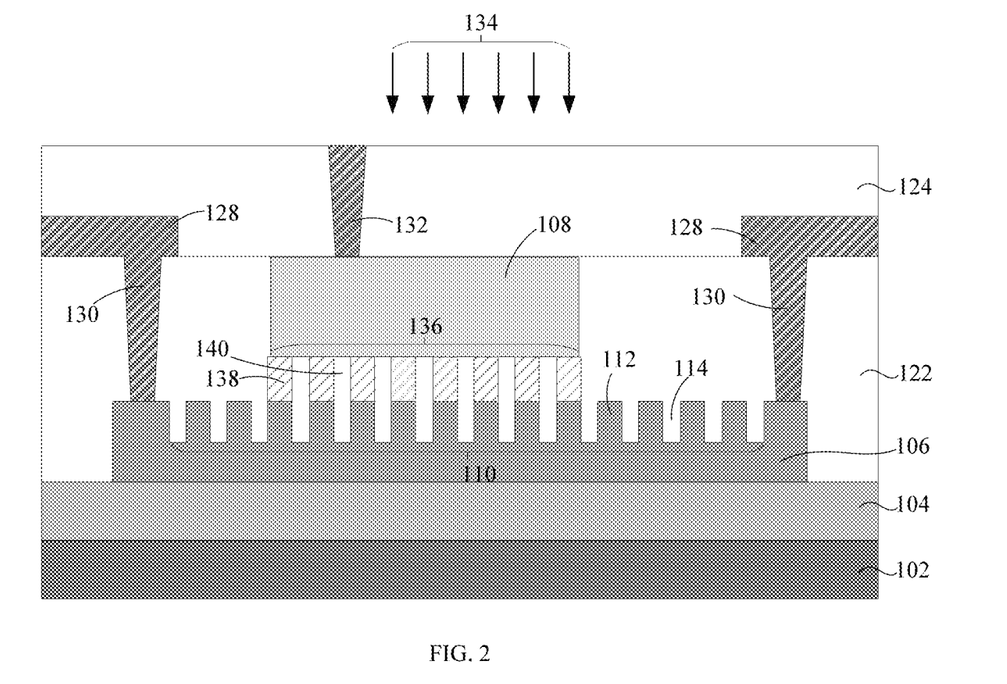

Referring to FIG. 1 and FIG. 2, embodiments of a semiconductor device for use in optoelectronic/photonic applications include a photonic component arranged above a substrate 102. Exemplary photonic components may include, but not limited to, photodetectors, waveguides, splitters, bends, tapers, and fibers. In the representative embodiments shown in FIG. 1 and FIG. 2, the photonic component is a photodetector 108. A bottom reflector 110 is arranged above the substrate 102 and positioned below the photodetector 108. The bottom reflector 110 has a plurality of grating structures 112 configured to reflect electromagnetic waves (e.g., light waves) towards the photodetector 108. The grating structures 112 are separated by grooves 114.

The substrate 102 may be made of any semiconductor material, such as silicon, germanium, silicon germanium (SiGe), silicon carbide, and those consisting essentially of III-V compound semiconductors, such as GaAs, II-VI compound semiconductors such as ZnSe. A portion or the entire substrate 102 may be amorphous, polycrystalline, or monocrystalline.

A semiconductor-on-insulator (SOI) substrate or a metal-on-insulator (MOI) substrate may be used to form the embodiments of the present disclosure. As shown in FIG. 1 and FIG. 2, an insulating layer 104 is arranged upon the substrate 102 and a top active layer 106 is arranged upon the insulating layer 104. The insulating layer 104 may be made of an oxide (e.g., silicon dioxide) or a nitride (e.g., silicon nitride).

The top active layer 106 may be made of a metallic material, such as copper (Cu), cobalt (Co), aluminum (Al), titanium (Ti), titanium nitride (TiN), gold (Cu), silver (Ag) or combinations thereof, or a semiconductor material such as silicon, germanium, silicon germanium (SiGe), silicon carbide, and those consisting essentially of III-V compound semiconductors, such as GaAs, II-VI compound semiconductors such as ZnSe. A portion or the entire semiconductor material may also be amorphous, polycrystalline, or monocrystalline.

As shown in FIG. 1 and FIG. 2, the plurality of grating structures 112 of the bottom reflector 110 may be formed upon the top active layer 106. The grating structure 112 may be formed by patterning the top active layer 106 using patterning techniques. During the patterning to form the grating structures 112, for example, an etch mask may be formed by a lithography process over the top active layer 106, and unmasked sections of the top active layer 106 are etched and removed with an etching process, such as reactive ion etching.

The photodetector 108 may be formed upon top surfaces of the grating structures 112 in the bottom reflector 110 using epitaxial growth (such as molecular beam epitaxy (MBE), liquid phase epitaxy, vapor phase epitaxy, or solid phase epitaxy), rapid melt growth, or deposition techniques as described herein. The photodetector 108 may include a germanium containing material, such as germanium or silicon-germanium. In some embodiments (not shown), the formation of the photodetector 108 also may fill up the grooves 114 between grating structures 112 that are directly underneath the photodetector 108.

Although not shown in the accompanying drawings, the top active layer 106 and the photodetector 108 may include doped regions to provide a PN junction or a PIN junction. For example, the top active layer 106 may be a doped semiconductor layer 106 which serves to provide an electrical pathway for current flow. Alternatively, the top active layer 106 may be a metallic material layer 106 that conducts electricity to provide the electrical pathway. Interconnect structures 128, 130, 132 may be formed upon the doped regions in the top active layer 106 and the photodetector 108 to provide electrical interconnections to other device components in a semiconductor device.

The bottom reflector 110, the top active layer 106, the photodetector 108 and the interconnect structures 128, 130, 132 may be covered with dielectric layers 122, 124. The interconnect structures 128, 130, 132 may include conductive materials such as copper (Cu), cobalt (Co), aluminum (Al), titanium (Ti), titanium nitride (TiN), etc. In some embodiments, the grooves 114 separating the grating structures 112 may be filled or substantially filled by the dielectric layer 122. The dielectric layers 122, 124 may provide protection for the photodetector 108 against chemical damage. Materials for the dielectric layers 122, 124 may have a refractive index in the range of about 1.3 to about 1.5. Examples of the materials for the dielectric layers 122, 124 may include, but not limited to, silicon dioxide ($SiO_2$), calcium fluoride ($CaF_2$), SiCOH, magnesium fluoride ($MgF_2$), or polymers (e.g., polyimide).

During operation of the semiconductor device, electromagnetic waves such as light waves 134 may be incident on a top surface of the photonic component, such as the photodetector 108. The inclusion of the bottom reflector 110 is found to reduce leakage of light waves by reflecting back the light waves leaked from a bottom surface of the photodetector 108, thereby increasing the efficiency of light absorption by the photodetector 108.

The devices in the present disclosure may include multiple bottom reflectors. In the representative embodiment shown in FIG. 2, the semiconductor device includes a first bottom reflector 110 and a second bottom reflector 136. The second bottom reflector 136 is arranged between the first bottom reflector 110 and the photodetector 108, and has a plurality of grating structures 138 configured to reflect electromagnetic waves towards the photodetector 108. The grating structures 138 of the second bottom reflector 136 are separated by grooves 140. The grooves 140 may be filled with the dielectric layer 122.

The second bottom reflector 136 may be made of a semiconductor material or a metallic material. In an embodiment, the second bottom reflector 136 may be formed by epitaxial growth of a semiconductor material upon top surfaces of the grating structures 112 in the first bottom reflector 110. The semiconductor material may be silicon, germanium, silicon germanium (SiGe), silicon carbide, and those consisting essentially of III-V compound semiconductors, such as GaAs, II-VI compound semiconductors such as ZnSe. A portion or the entire semiconductor material may also be amorphous, polycrystalline, or monocrystalline.

Alternatively, in another embodiment (not shown), the second bottom reflector 136 may be formed by performing various deposition and patterning steps. For example, the dielectric layer 122 covering the first bottom reflector 110 may be patterned using patterning techniques to form a plurality of openings above the grating structures 112 in the first bottom reflector 110. The openings are subsequently filled with a metallic material using deposition techniques to form the grating structures 138 in the second bottom reflector 136. The photodetector 108 may be subsequently deposited upon the grating structure 138. Examples of a metallic material for the second bottom reflector 136 may include, but not limited to, copper (Cu), cobalt (Co), aluminum (Al), titanium (Ti), titanium nitride (TiN), gold (Cu), silver (Ag) or combinations thereof. The material for the grating structures in the respective reflectors 110 and 136 may have a refractive index in the range of about 1.8 to about 5, and preferably in the range of 2.5 to 5.

The second bottom reflector 136 may be made of a different material from the first bottom reflector 110. For example, the second bottom reflector 136 can made of polycrystalline silicon, while the first bottom reflector 110 can made of monocrystalline silicon.

The photodetector 108 may be formed upon top surfaces of the grating structures 138 in the second bottom reflector 136. The inclusion of the multiple bottom reflectors in the semiconductor device may provide additional reduction of light leakage, which results in higher efficiency of light absorption.

Figure 3A:
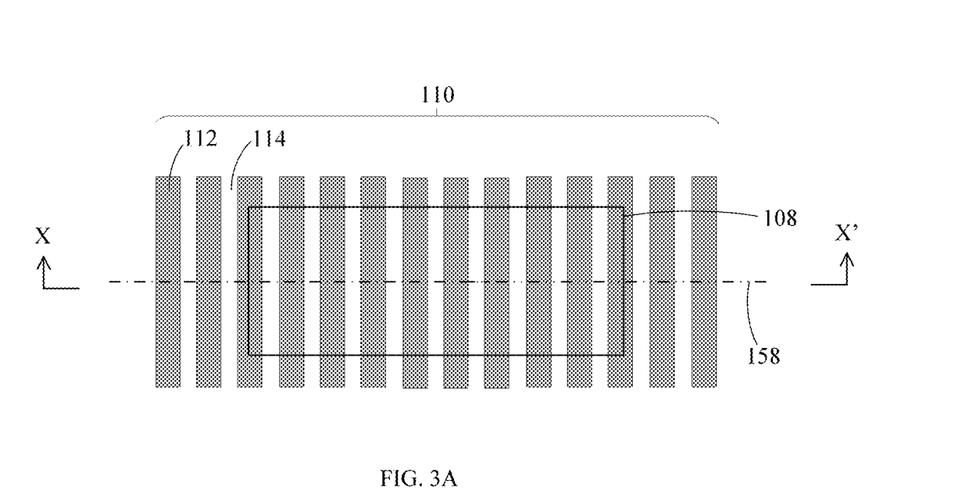
FIG. 3A and FIG. 3B are plan views depicting exemplary arrangements of a bottom reflector relative to a photonic component in a semiconductor device, in accordance with embodiments of the present disclosure.
Figure 3B:
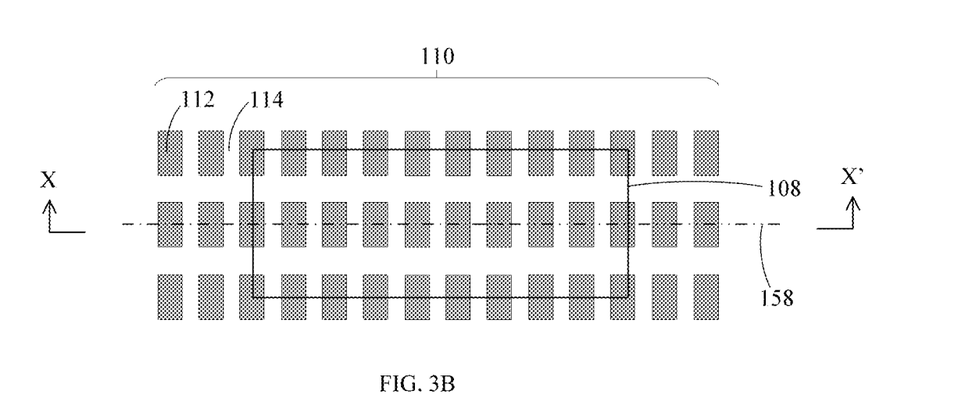

FIG. 3A and FIG. 3B illustrate exemplary layout arrangements of the bottom reflector 110 relative to the photodetector 108. The line X-X' in FIG. 3A and FIG. 3B indicates the cross-section line in which the views shown in FIG. 1 and FIG. 2 are taken from. For simplicity, only the grating structures 112 in the first bottom reflector 110 and the photodetector 108 are shown, and the photodetector 108 is being represented by a rectangle.

As shown in FIG. 3A and FIG. 3B, the grating structures 112 may have a given periodicity along a longitudinal axis 158 of the bottom reflector 110 defined by a pitch and a filling factor or duty cycle. The pitch represents a distance along the longitudinal axis 158 of the reflector 110 between adjacent pairs of the grating structures 112, and the duty cycle represents a fraction of the total area of the reflector 110 that is occupied by the grating structures 112 as opposed to the grooves 114. Each grating structure 112 may have a width. The widths and the pitch of the plurality of grating structures 112 may be configured to have dimensions in the microscale (e.g., tens to hundredths of microns) so as to provide the reflector 110 with a reflective property. As shown, the grating structures 112 are periodic with a single pitch and duty cycle. Alternatively, in another embodiment (not shown), the grating structures 112 may be apodized (i.e., aperiodic) with a pitch and/or a duty cycle that varies along the longitudinal axis 158.

Also illustrated in FIG. 3A, the grating structures 112 may be configured as a single array. Alternatively, the plurality of grating structures 112 in the bottom reflector 110 may be configured as a matrix of structures. For example, as illustrated in FIG. 3B, the grating structures 112 are arranged in a matrix with 3 rows and 14 columns. Other numerical combinations of rows and columns within the matrix may also be implemented. It should be understood that the exemplary configurations of the grating structures 112, as described in FIG. 3A and FIG. 3B, are contemplated as being applicable to the grating structures 138 in the second bottom reflector 136. The configuration of a matrix of structures may offer the advantage of achieving better reflective effect as compared to the configuration of a single array. Additionally, a matrix configuration provides higher density of grating structures in the reflector, which enables greater degree of freedom in engineering the reflectivity of the reflector for achieving optimal optical performance.

Figure 4:
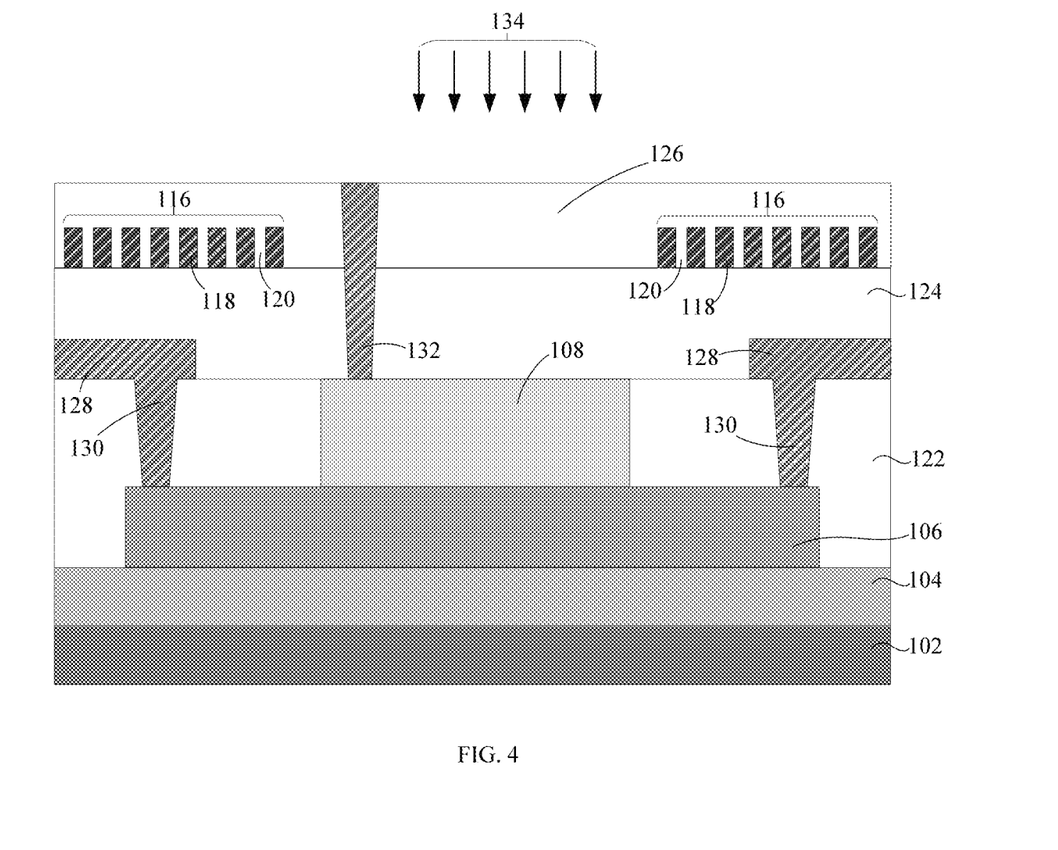
FIG. 4 and FIG. 5 are cross-sectional views depicting embodiments of a semiconductor device having at least one top reflector, in accordance with the present disclosure.
Figure 5:
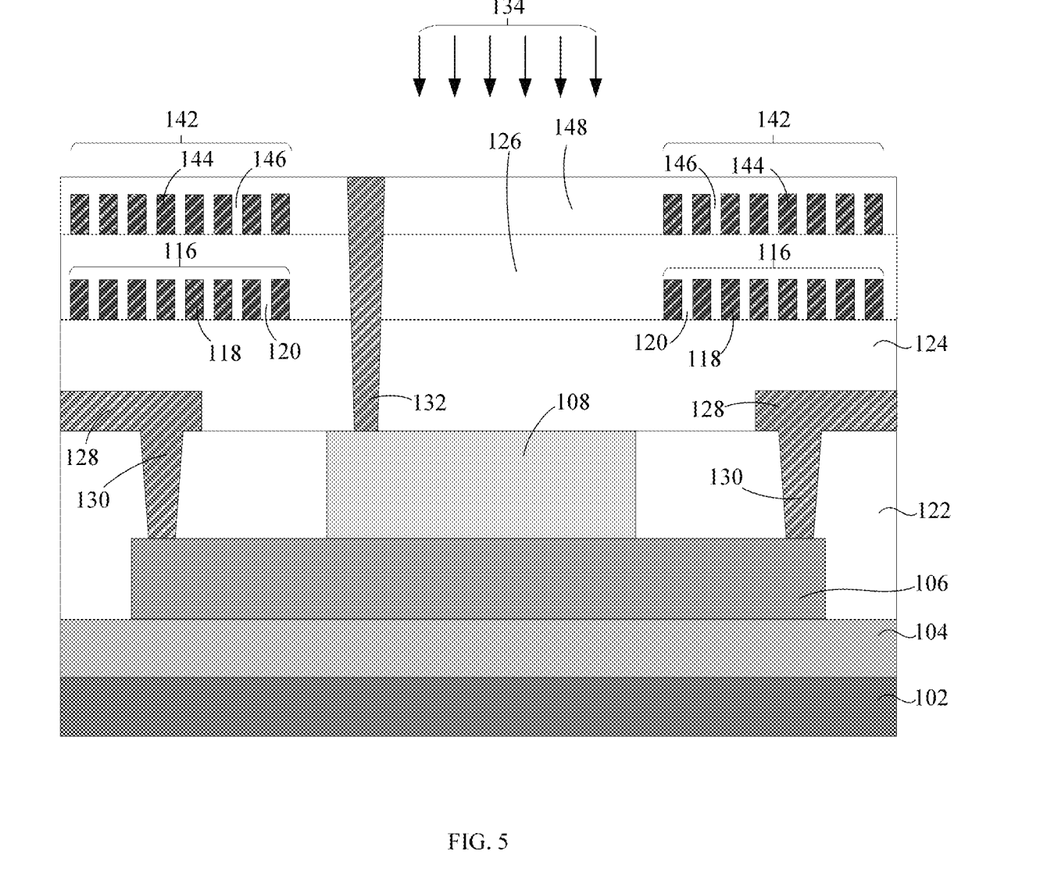

With reference to FIG. 4 and FIG. 5, in which like reference numerals refer to like features in FIG. 1 and FIG. 2, the semiconductor device includes a top reflector 116 arranged above the photodetector 108, in which the top reflector 116 has a plurality of grating structures 118 configured to reflect electromagnetic waves towards the photodetector 108. The grating structures 118 are separated by grooves 120 and are formed within a dielectric layer 126. Unlike the embodiments shown in FIG. 1 and FIG. 2, the top active layer 106 does not have grating structures formed thereupon to provide a bottom reflector.

The plurality of grating structures 118 of the top reflector 116 may be formed by deposition of a layer of material using deposition techniques, followed by patterning the deposited layer using patterning techniques. Materials for forming the top reflector 116 may include, but not limited to, metallic materials such as copper (Cu), cobalt (Co), aluminum (Al), titanium (Ti), titanium nitride (TiN), gold (Cu), silver (Ag), or combinations thereof, dielectric materials such as silicon nitride, or semiconductor materials such as silicon, germanium, silicon germanium (SiGe), silicon carbide, and III-V compound semiconductors, II-VI compound semiconductors. The semiconductor materials may also be amorphous, polycrystalline, or monocrystalline. The material for the grating structures in the reflector 116 may have a refractive index in the range of about 1.8 to about 5, and preferably in the range of 2.5 to 5.

In some embodiments, the device may include multiple top reflectors. Multiple top reflectors may be formed by performing additional deposition of layers and patterning thereof. For example, as illustrated in FIG. 5, the semiconductor device includes a first top reflector 116 and a second top reflector 142. The second top reflector 142 is arranged above the first top reflector 116 in a vertically stacked configuration. Dielectric layers 126, 148 cover the first top reflector 116 and the second top reflector 142 and fills the grooves 120, 146. The second top reflector 142 has a plurality of grating structures 144, and the grating structures 144 are separated by grooves 146.

Materials for forming the second top reflector 142 may include, but not limited to, metallic materials such as copper (Cu), cobalt (Co), aluminum (Al), titanium (Ti), titanium nitride (TiN), gold (Cu), silver (Ag), or combinations thereof, dielectric materials such as silicon nitride, or semiconductor materials such as silicon, germanium, silicon germanium (SiGe), silicon carbide, and III-V compound semiconductors, II-VI compound semiconductors. The semiconductor materials may also be amorphous, polycrystalline, or monocrystalline. The material for the grating structures in the reflector 142 may have a refractive index in the range of about 1.8 to about 5, and preferably in the range of 2.5 to 5.

During operation of the semiconductor device, electromagnetic waves such as light waves 134 may be incident on a top surface of the photonic component, such as the photodetector 108. The photodetector 108 has a top surface that is uncovered by the top reflectors 116, 142 so as to allow maximal incidence of light waves 134 on the top surface. The inclusion of a single top reflector 116 is found to reduce leakage of the light waves by reflecting back the light waves scattered from lateral sides and edges of the photodetector 108, thereby increasing the efficiency of light absorption by the photodetector 108. Additionally, the implementation of multiple top reflectors 116, 142 may offer the advantage of higher efficiency of light absorption as compared to the implementation of a single top reflector 116.

FIG. 6A to FIG. 6D illustrate exemplary layout arrangements of the top reflector 116 relative to the photodetector 108. The line X-X' in FIG. 6A to FIG. 6D indicates the cross-section line in which the views shown in FIG. 4 and FIG. 5 are taken from. For simplicity, only the grating structures 118 in the first top reflector 116 and the photodetector 108 are shown, and the photodetector 108 is being represented by a rectangle.

In the representative embodiments, the grating structures 118 may have a given periodicity along a longitudinal axis 160 of the top reflector 116 defined by a pitch and a filling factor or duty cycle. The pitch represents a distance along the longitudinal axis 160 of the reflector 116 between adjacent pairs of the grating structures 118, and the duty cycle represents a fraction of the total area of the reflector 116 that is occupied by the grating structures 118 as opposed to the grooves 120. Each grating structure 118 may have a width. The widths and the pitch of the plurality of grating structures 118 may be configured to have dimensions in the microscale (e.g., tens to hundredths of microns) so as to provide the reflector 116 with a reflective property. As shown, the grating structures 118 are periodic with a single pitch and duty cycle. Alternatively, in another embodiment (not shown), the grating structures 118 may be apodized (i.e., aperiodic) with a pitch and/or a duty cycle that varies along the longitudinal axis 160.

Figure 6A:
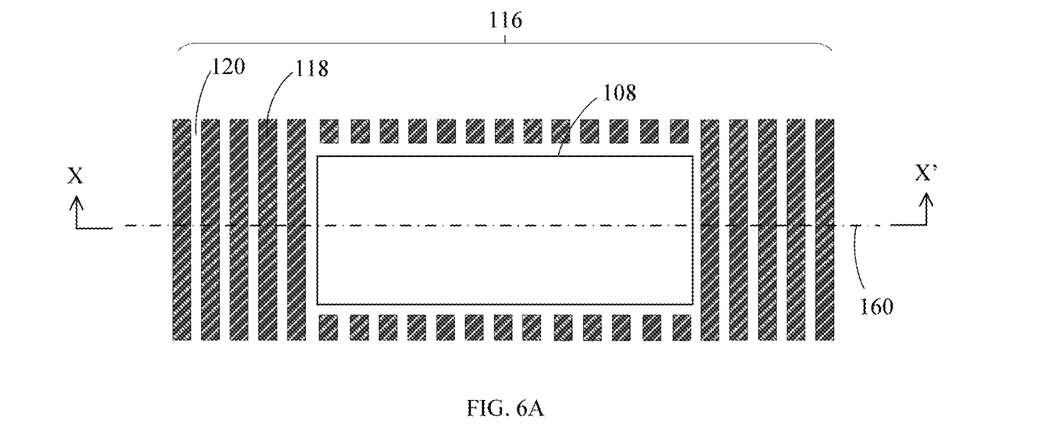
FIG. 6A to FIG. 6D are plan views depicting exemplary arrangements of a top reflector relative to a photonic component in a semiconductor device, in accordance with embodiments of the present disclosure.
Figure 6B:
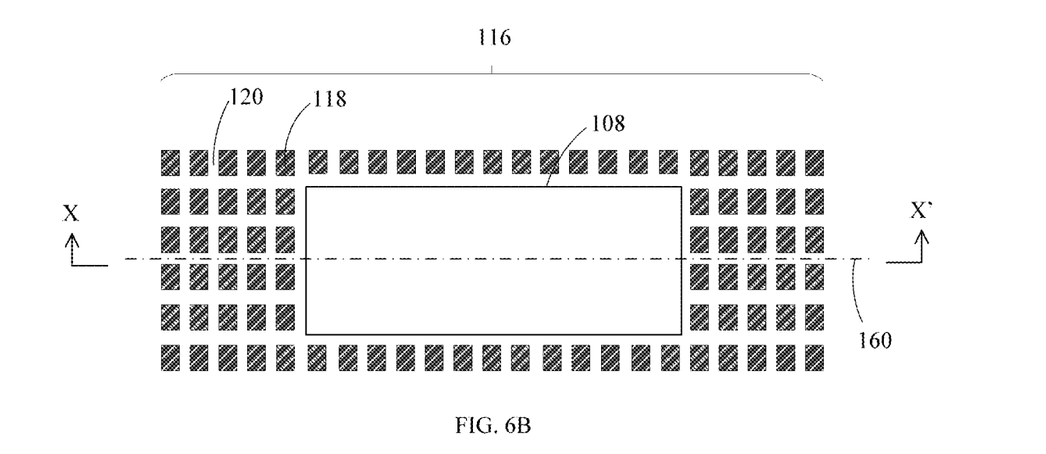

In the embodiments shown in FIG. 6A and FIG. 6B, the top surface of the photodetector 108 may be uncovered by the top reflector 116 such that the photodetector 108 is peripherally enclosed by the grating structures 118. Alternatively, in the embodiments shown in FIGS. 6C and 6D, the top surface of the photodetector 108 may be uncovered by arranging one or more top reflectors 116a, 116b within the same dielectric layer, and positioning them above and laterally adjacent to the photodetector 108.

Figure 6C:
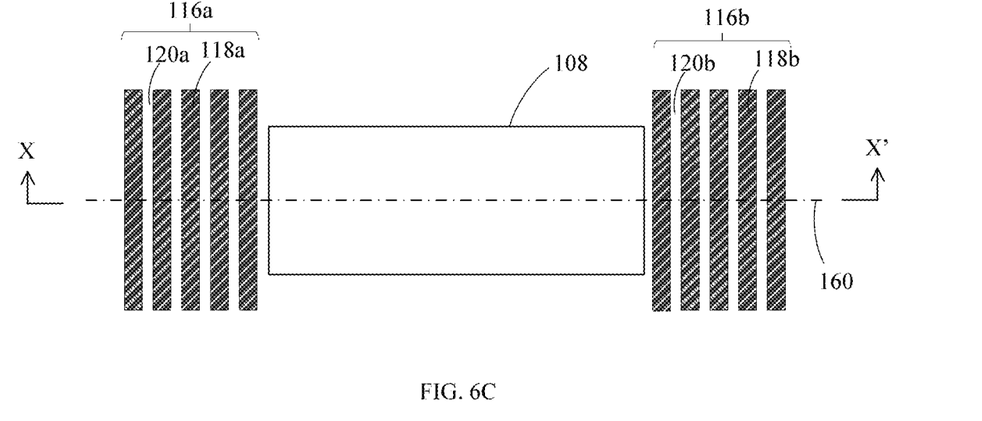
Figure 6D:
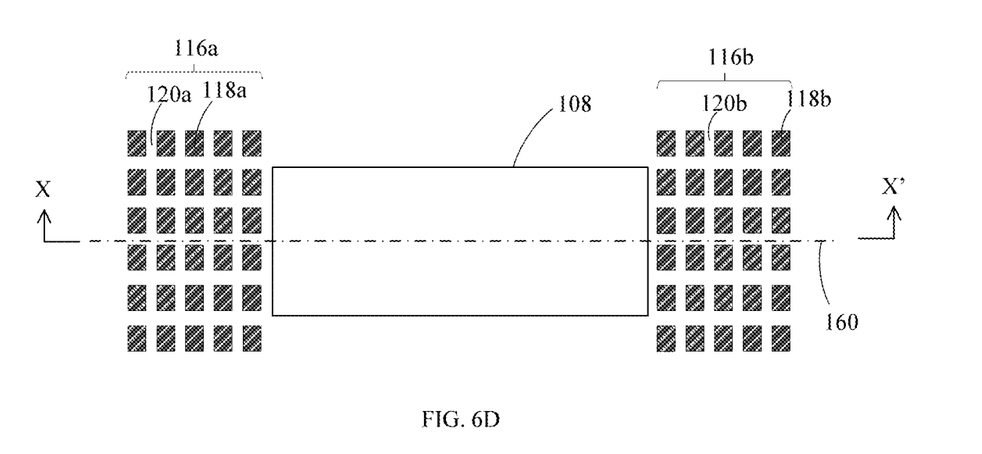

Additionally, the grating structures 118 may be configured as a single array, as illustrated in FIG. 6A and FIG. 6C. Alternatively, the plurality of grating structures 118 may be configured as a matrix of structures having rows and columns, as illustrated in FIG. 6B and FIG. 6D. It should be understood that the exemplary configurations of the grating structures 118 in the first top reflector 116, as illustrated in FIG. 6A to FIG. 6D are contemplated as being applicable to the grating structures 144 in the second top reflector 142.

Figure 7:
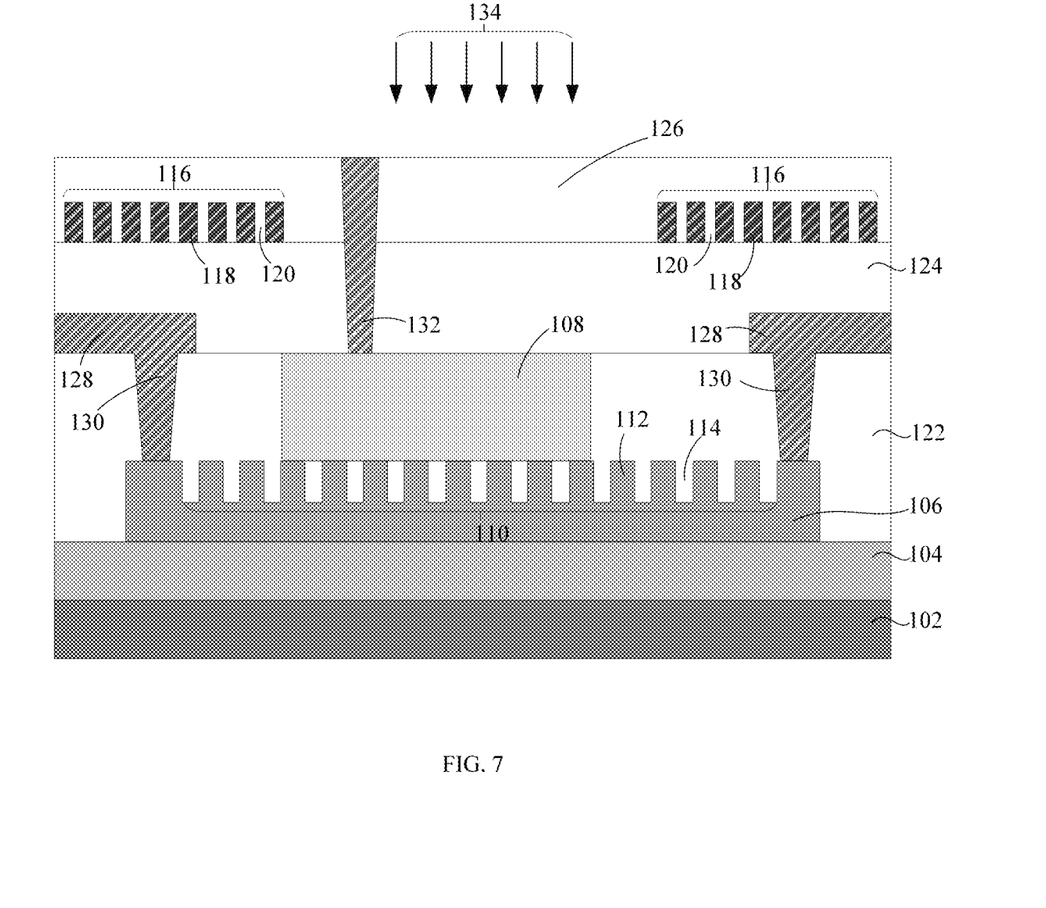
FIG. 7 to FIG. 10 are cross-sectional views depicting embodiments of a semiconductor device having at least one top reflector and at least one bottom reflector, in accordance with the present disclosure.
Figure 8:
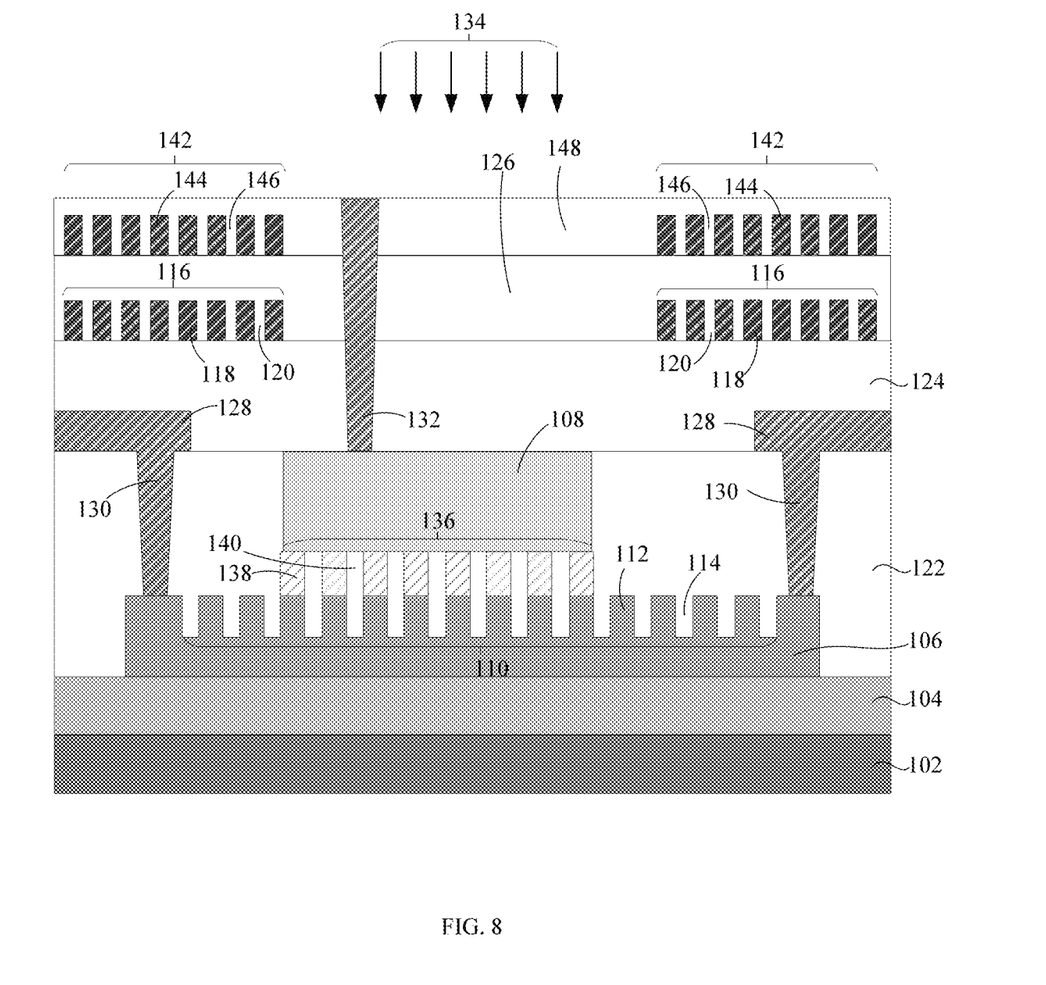

With reference to FIG. 7 and FIG. 8, in which like reference numerals refer to like features in FIG. 1, FIG. 2, FIG. 4, and FIG. 5, the devices of the present disclosure may include at least one top reflector and at least one bottom reflector. For example, in the embodiment shown in FIG. 7, there is provided a top reflector 116 arranged above the photodetector 108, and a bottom reflector 110 arranged between the photodetector 108 and the substrate 102. In another embodiment shown in FIG. 8, multiple bottom reflectors (e.g., a first bottom reflector 110 and a second bottom reflector 136) may be arranged between the photodetector 108 and the substrate 102, and multiple top reflectors (e.g., a first top reflector 116 and a second top reflector 142) may be arranged above the photodetector 108.

The integration of both a top reflector and a bottom reflector may offer the advantage of having the highest efficiency of light absorption by reflecting back light waves leaked/scattered from the bottom surface as well as the lateral sides/edges of the photonic component. For example, in a simulation study, it was found that a semiconductor device having both top and bottom reflectors achieved 53% absorption efficiency, whereas a semiconductor device without any reflectors achieved 35% absorption efficiency.

Figure 9:
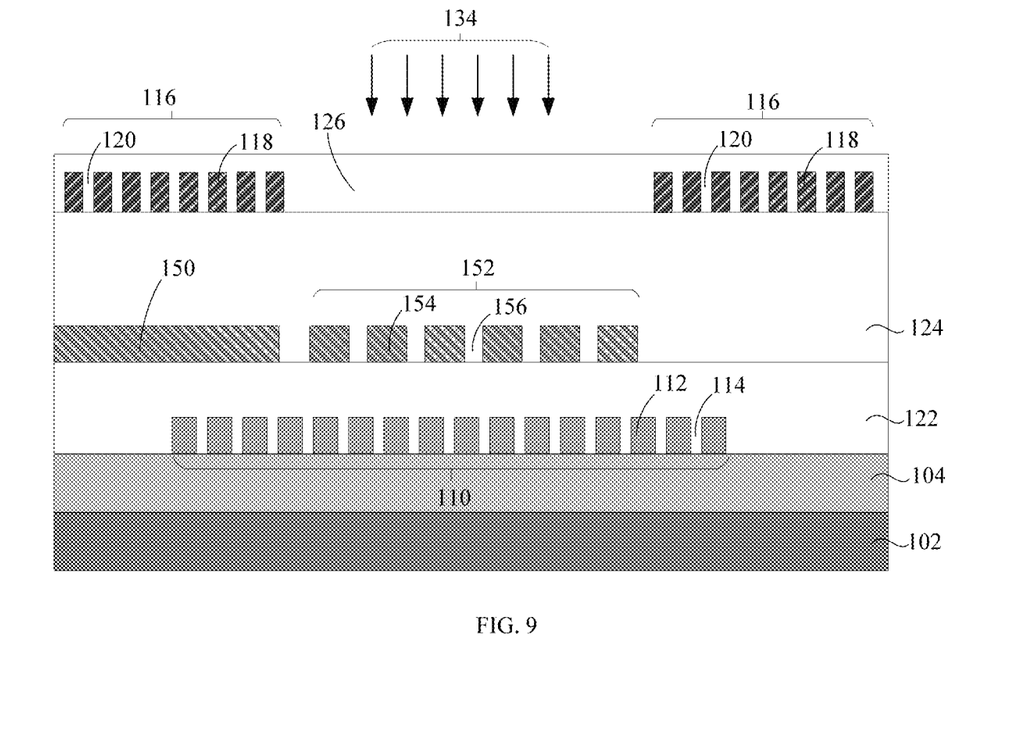
Figure 10:
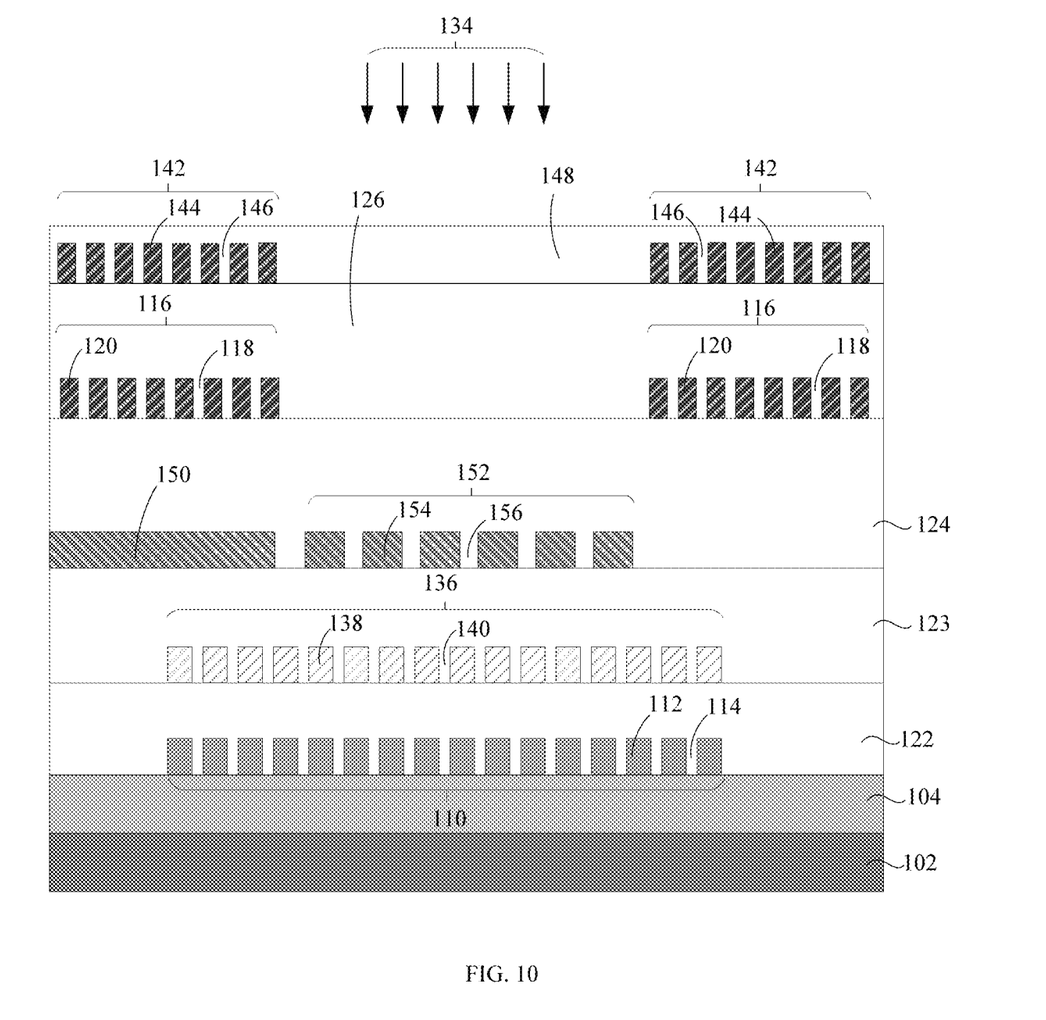

Referring to FIG. 9 and FIG. 10, embodiments of a semiconductor device for use in optoelectronic/photonic applications may include a waveguide coupler 152 arranged above a substrate 102. The waveguide coupler 152 has a plurality of grating structures 154, in which the grating structures 154 are separated by grooves 156. The grooves 156 may be filled or substantially filled with the dielectric layer 124. The waveguide coupler 152 is optically coupled to a waveguide body 150 that is arranged above the substrate 102 and being adjacent to the waveguide coupler 152. The waveguide coupler 152 may function to absorb illuminated light waves 134 which are subsequently transmitted through the waveguide body 150 to other optical device components.

Each grating structure 154 in the waveguide coupler 152 may have a width. The plurality of grating structures 154 may also have a periodicity defined by a pitch and a filling factor or duty cycle as described herein. In particular, the widths and the pitch of the plurality of grating structures 154 may be configured to have dimensions in the nanoscale (e.g., tens to hundredths of nanometers) so as to enable the waveguide coupler 152 to confine the absorbed electromagnetic waves.

The waveguide coupler 152 and the waveguide body 150 may be made of materials such as silicon nitride (SiN), silicon oxynitride (SiON), aluminum nitride (AlN) or other nitride-containing compounds. The waveguide coupler 152 and the waveguide body 150 may be formed concurrently by deposition of a layer of material as described above using deposition techniques, followed by patterning the deposited layer using patterning techniques.

A top reflector 116 may be arranged above the waveguide coupler 152. As shown, the waveguide coupler 152 has a top surface that is uncovered by the top reflector 116 allow maximal incidence of light waves 134 on the top surface. Additionally, the top surface of the waveguide coupler 152 may be peripherally enclosed by the grating structures 118 in the top reflector 116. Materials for forming the top reflector 116 may include, but not limited to, metallic materials copper (Cu), cobalt (Co), aluminum (Al), titanium (Ti), titanium nitride (TiN), gold (Cu), silver (Ag), or combinations thereof, dielectric materials such as silicon nitride, or semiconductor materials such as silicon, germanium, silicon germanium (SiGe), silicon carbide, and III-V compound semiconductors, II-VI compound semiconductors. The semiconductor material may also be amorphous, polycrystalline, or monocrystalline.

A bottom reflector 110 may be arranged between the substrate 102 and the waveguide coupler 152. As shown, the grating structures 112 in the bottom reflector 110 may be arranged upon the insulating layer 104 and may be made of a metallic material, such as copper (Cu), cobalt (Co), aluminum (Al), titanium (Ti), titanium nitride (TiN), gold (Cu), silver (Ag) or combinations thereof, or a semiconductor material such as silicon, germanium, silicon germanium (SiGe), silicon carbide, and those consisting essentially of III-V compound semiconductors, such as GaAs, II-VI compound semiconductors such as ZnSe. In addition, the material of the grating structures 112 may also be amorphous, polycrystalline, or monocrystalline.

In the embodiment shown in FIG. 10, multiple bottom reflectors (e.g., a first bottom reflector 110 and a second bottom reflector 136) may be arranged between the photodetector 108 and the substrate 102, and multiple top reflectors (e.g., a first top reflector 116 and a second top reflector 142) may be arranged above the photodetector 108. The grating structures 138 in the second bottom reflector 136 may be made of metallic materials such as copper (Cu), cobalt (Co), aluminum (Al), titanium (Ti), titanium nitride (TiN), gold (Cu), silver (Ag), or combinations thereof, dielectric materials such as silicon nitride, or semiconductor materials such as silicon, germanium, silicon germanium, (SiGe), silicon carbide, and III-V compound semiconductors, II-VI compound semiconductors. The semiconductor material may also be amorphous, polycrystalline, or monocrystalline. The semiconductor material may also be amorphous, polycrystalline, or monocrystalline.

The materials for the grating structures in the respective top reflectors 110, 136 and bottom reflectors 116, 142 may have a refractive index in the range of about 1.8 to about 5, and preferably in the range of 2.5 to 5. The waveguide body 150, the waveguide coupler 156, the bottom reflectors 110, 136 and the top reflectors 116, 142 may be formed within dielectric layers 122, 123, 124, 126, 148.

The grating structures in the top reflectors 116, 142 and the bottom reflectors 110, 136 may have widths and a periodicity defined by a pitch and a filling factor or duty cycle as described herein. The configuration of the grating structures in the top reflectors 116, 142 and the bottom reflectors 110, 136 are larger than the configuration of the grating structures in the waveguide coupler 156. In particular, the widths and the pitches of the respective grating structures in the top reflectors 116, 142 and the bottom reflectors 110, 136 may be configured to have dimensions in the microscale (e.g., tens to hundredths of microns) so as to provide top reflectors 116, 142 and the bottom reflectors 110, 136 with reflective properties.

Figure 11:
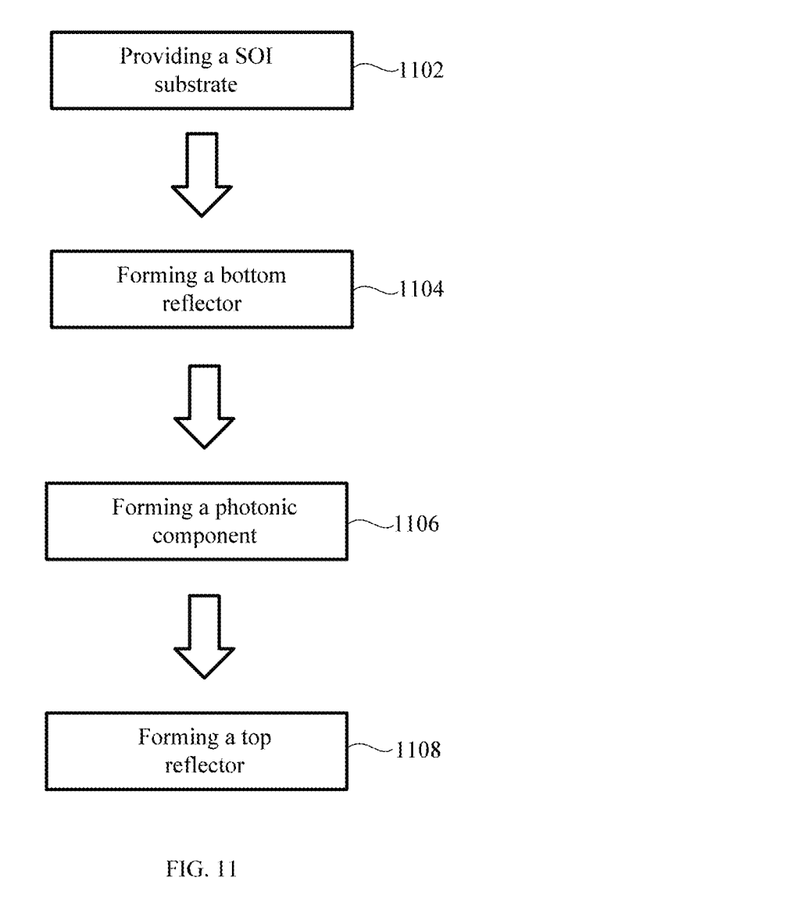
FIG. 11 is a flowchart depicting exemplary steps in a method of forming a semiconductor device in accordance with embodiments of the present disclosure.

FIG. 11 depicts a flowchart illustrating exemplary steps in a method of forming a semiconductor device in accordance with embodiments of the present disclosure. With reference to FIG. 11, the method may include providing an SOI substrate in step 1102. The SOI substrate may include a substrate, a top semiconductor layer and an insulating layer arranged between the substrate and the top semiconductor layer. It should be understood that an MOI substrate may alternatively be used.

In step 1104, the method may also include forming the bottom reflector by patterning the top semiconductor layer of the SOI substrate such that the bottom reflector has the grating structures as described herein. The patterning of the top semiconductor layer also forms the grooves separating the grating structures. A dielectric layer may be deposited to cover the bottom reflector. The step 1104 may be skipped in order to form the embodiments shown in FIG. 4 and FIG. 5.

In step 1106, the method further includes forming a photonic component above the substrate. For example, a photodetector may be formed by epitaxial growth of a semiconductor material from the top surfaces of the grating structures in the bottom reflector. In another example, a waveguide coupler and a waveguide body may be formed by deposition of a dielectric material and patterning the deposited dielectric material. A dielectric layer may be deposited to cover the photonic component.

In step 1108, the method may also include forming a top reflector above the photonic component. Formation of the bottom reflector may be performed by depositing a layer, followed by patterning the deposited layer to form the grating structures described above. The patterning of the deposited layer also forms the grooves separating the grating structures. The step 1108 may be skipped in order to form the embodiments shown in FIG. 1 and FIG. 2.

The flowchart in the figures illustrates the architecture, functionality, and operation of possible implementations of devices and methods according to various embodiments described herein. In this regard, each step/block in the flowchart may represent a module, segment, or portion of instructions, which includes one or more executable instructions for implementing the specified logical function(s). In some alternative implementations, the functions noted in the step/block may occur out of the order noted in the figures. For example, two steps/blocks shown in succession may, in fact, be executed substantially concurrently, or the steps/blocks may sometimes be executed in the reverse order, depending upon the functionality involved. It will also be noted that each step/block of the flowchart illustration, and combinations of steps/blocks in the flowchart illustration, can be implemented by special purpose hardware-based systems that perform the specified functions or acts or carry out combinations of special purpose hardware and computer instructions.

Throughout this disclosure, the terms top, upper, upwards, over, and above refer to the direction away from the substrate. Likewise, the terms bottom, lower, downwards, under, and below refer to the direction towards the substrate. It is to be understood that the terms so used are interchangeable under appropriate circumstances such that the embodiments of the device described herein are, for example, capable of operation in other orientations than those illustrated or otherwise described herein.

Similarly, if a method is described herein as involving a series of steps, the order of such steps as presented herein is not necessarily the only order in which such steps may be performed, and certain of the stated steps may possibly be omitted and/or certain other steps not described herein may possibly be added to the method. Furthermore, the terms "comprise", "include", "have", and any variations thereof, are intended to cover a non-exclusive inclusion, such that a process, method, article, or device that comprises a list of elements is not necessarily limited to those elements, but may include other elements not expressly listed or inherent to such process, method, article, or device. Occurrences of the phrase "in an embodiment" herein do not necessarily all refer to the same embodiment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Furthermore, there is no intention to be bound by any theory presented in the preceding background or the following detailed description.

Additionally, the various tasks and processes described herein may be incorporated into a more comprehensive procedure or process having additional functionality not described in detail herein. In particular, various processes in the manufacture of integrated circuits are well-known and so, in the interest of brevity, many conventional processes are only mentioned briefly herein or omitted entirely without providing the well-known process details.

As will be readily apparent to those skilled in the art upon a complete reading of the present application, the semiconductor devices and methods disclosed herein may be employed in manufacturing a variety of different integrated circuit products and modules, including, but not limited to, CMOS devices, optoelectronic modules, LIDAR instrumentation and LIDAR systems, etc.

What is claimed is:
1. A semiconductor device comprising:
    a substrate;
    a photonic component arranged above the substrate;
    a first bottom reflector arranged above the substrate and positioned below the photonic component; and a second bottom reflector arranged vertically between the first bottom reflector and the photonic component, wherein the first bottom reflector and the second bottom reflector have a plurality of grating structures configured to reflect electromagnetic waves towards the photonic component, and wherein the grating structures in the first bottom reflector have top surfaces, and the grating structures in the second bottom reflector is directly on the top surfaces of the grating structures in the first bottom reflector.

2. The semiconductor device of claim 1, wherein the grating structures in the second bottom reflector includes a different material from the grating structures in the first bottom reflector.

3. The semiconductor device of claim 2, wherein the grating structures in the first bottom reflector include a semiconductor material.

4. The semiconductor device of claim 3, wherein the grating structures in the first bottom reflector include monocrystalline silicon and the grating structures in the second bottom reflector include polycrystalline silicon.

5. The semiconductor device of claim 3, wherein the grating structures in the second bottom reflector include a metallic material.

6. The semiconductor device of claim 1, wherein the grating structures in the second bottom reflector includes a same material as the grating structures in the first bottom reflector.

7. The semiconductor device of claim 1, wherein the photonic component is a waveguide coupler.

8. The semiconductor device of claim 7, wherein the waveguide coupler includes a dielectric material.

9. The semiconductor device of claim 7, wherein the waveguide coupler is optically coupled to an adjacent waveguide body, the waveguide body being arranged above the substrate.

10. The semiconductor device of claim 7, further comprising an insulating layer arranged upon the substrate, wherein the first bottom reflector is arranged upon the insulating layer.

11. The semiconductor device of claim 7, further comprising a dielectric layer between the second bottom reflector and the waveguide coupler.

12. The semiconductor device of claim 1, wherein the photonic component is a photodetector.

13. The semiconductor device of claim 12, wherein the photodetector includes a germanium containing compound.

14. The semiconductor device of claim 12, wherein the grating structures in the second bottom reflector have top surfaces, and the photodetector is directly on the top surfaces of the grating structures in the second bottom reflector.

15. The semiconductor device of claim 1, wherein the grating structures in the first bottom reflector and the second bottom reflector have widths and pitches that are configured to have dimensions in the microscale.

* * * * *